(No Model.)

J. W. THACKARA.
BORING IMPLEMENT.

No. 417,116. Patented Dec. 10, 1889.

Witnesses:
Hamilton D. Turner
Alex Barkoff

Inventor:
John W. Thackara
by his Attorneys
Howson & Howson

UNITED STATES PATENT OFFICE.

JOHN W. THACKARA, OF LINCOLN, NEBRASKA.

BORING IMPLEMENT.

SPECIFICATION forming part of Letters Patent No. 417,116, dated December 10, 1889.

Application filed February 15, 1889. Serial No. 300,001. (No model.)

*To all whom it may concern:*

Be it known that I, JOHN W. THACKARA, a citizen of the United States, and a resident of Lincoln, Lancaster county, Nebraska, have invented certain Improvements in Boring Implements, of which the following is a specification.

The object of my invention is to construct a device for boring or drilling holes at angles and in localities inaccessible with the ordinary brace. This object I attain in the manner hereinafter set forth, reference being had to the accompanying drawings, in which—

Figure 1:
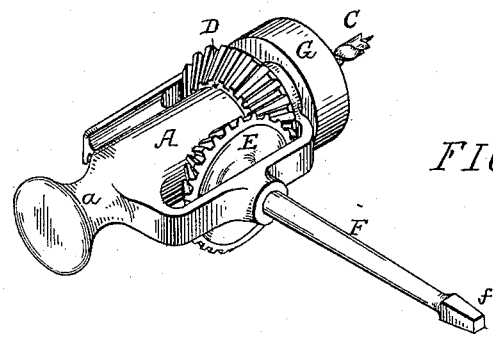
Figure 2:
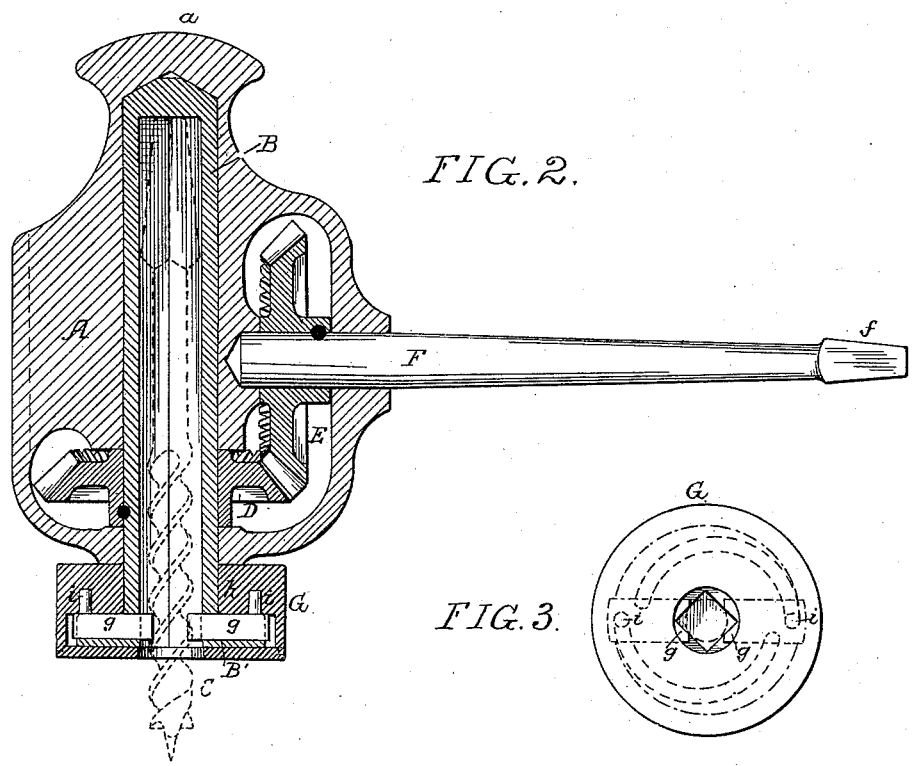
Figure 3:
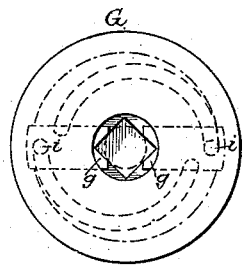

Figure 1 is a perspective view of my improved boring implement. Fig. 2 is a longitudinal section of the same, and Fig. 3 is an end view showing the chucking mechanism.

In carpentry, mill-wright work, and cabinet-making, holes sometimes have to be bored in narrow spaces and at angles where it would be impossible to use the ordinary brace and bit; and the object of my invention is to provide an implement for use in such cases.

My improved implement is so constructed as to be capable of use in connection with the ordinary brace, A being the frame of the device, having a head $a$, which is hollow for the reception of the spindle B, the latter being also hollow to receive the shank of the bit C. Secured to the spindle B is a bevel-wheel D, which meshes with a bevel-wheel E on a spindle F, having its bearings in the frame A, the outer end of this spindle being preferably squared, as at $f$, to fit the socket of an ordinary brace, although it will be understood that a crank may be adapted to this spindle to answer the purpose of the brace. On turning the brace the spindle F will be turned and motion will be imparted to the hollow spindle B through the bevel-gears.

I have shown the bevel-gears as of the same diameter; but it will be understood that they may be geared two to one, or in other proportions, depending upon the work for which the device is intended.

On the outer end of the hollow spindle B is a centering-chuck G, this chuck in the present instance having two jaws $g$ $g$, guided in the head B' of the spindle B. These jaws are moved from and toward the center of the spindle by means of cams on the casing $h$, the cams being in the form of grooves, with which engage pins $i$, projecting from the ends of the jaws $g$ $g$, so that on turning the casing $h$ the jaws will be moved toward or from the center of the spindle. The central longitudinal opening in the spindle is squared for the reception of the squared end of the shank of the bit, so as to insure the turning of the latter by the spindle, the bit being centered by the jaws $g$ of the chuck, which engage with the round portion of the bit.

This device is particularly adapted for use in connection with mill-wright work, where hangers have to be secured to the joists of buildings, the joists in many instances being so close together that it is impossible to bore holes therein with the ordinary brace and bit; but by the use of my improved device the holes can be bored in the joists with the brace at right angles to the line of the hole, the bit being adjusted in the hollow spindle; hence the usual long bits can be used in a space but little wider than that of the length of the bit.

I claim as my invention—

1. The combination of the frame, the hollow spindle therein squared internally for engagement with the squared shank of a boring-bit, the driving-spindle at an angle to said hollow spindle, and gearing connecting the two spindles, substantially as specified.

2. The combination of the frame, the hollow spindle therein squared internally for the reception of the squared end of a boring-bit and having at the front end a chuck with jaws for bearing upon and centering in respect to the spindle the round portion of the bit, the driving-spindle at an angle to the hollow spindle, and gearing connecting the two spindles, substantially as specified.

In testimony whereof I have signed my name to this specification in the presence of two subscribing witnesses.

JOHN W. THACKARA.

Witnesses:
WILLIAM D. CONNER,
HARRY SMITH.